United States Patent [19]

Kamps et al.

[11] Patent Number: 5,762,847
[45] Date of Patent: Jun. 9, 1998

[54] METHOD FOR THE RE-UTILIZATION OF AN OPTICAL

[75] Inventors: Rainer Kamps, Grub; Walter Pfandl, Ahorn; Frederic Zapf, Neustadt; Reiner Schneider, Ebersdorf, all of Germany

[73] Assignee: Siemens Aktiengesellschaft, Munich, Germany

[21] Appl. No.: 583,655

[22] Filed: Jan. 5, 1996

[30] Foreign Application Priority Data

Jan. 5, 1995 [DE] Germany .................. 195 00 467.1

[51] Int. Cl.⁶ .................................................. B29B 17/00
[52] U.S. Cl. .................. 264/140; 264/37; 264/171.1; 264/176.1; 264/349; 264/DIG. 69
[58] Field of Search ..................... 264/37, 1.28, 109, 264/122, 141, 142, 328.18, 349, DIG. 69, 140, 171.1, 176.1

[56] References Cited

U.S. PATENT DOCUMENTS

| | | | |
|---|---|---|---|
| 3,751,535 | 8/1973 | Ruoti et al. | 264/DIG. 69 |
| 3,956,541 | 5/1976 | Pringle | 264/122 |
| 4,387,958 | 6/1983 | Zeidler et al. | |
| 5,217,655 | 6/1993 | Schmidt | 264/DIG. 69 |
| 5,335,302 | 8/1994 | Polle | |
| 5,358,680 | 10/1994 | Boissonnat et al. | 264/328.18 |

FOREIGN PATENT DOCUMENTS

| | | | |
|---|---|---|---|
| 0 375 685 | 3/1993 | European Pat. Off. | |
| 41 12 171 | 9/1992 | Germany | 246/37 |
| 54-34019 | 10/1979 | Japan | 264/141 |
| 5-329842 | 12/1993 | Japan | 264/37 |

*Primary Examiner*—Mathieu D. Vargot
*Attorney, Agent, or Firm*—Hill & Simpson

[57] ABSTRACT

An improved optical cable having at least one light waveguide having a coating and other component parts in the form of protective sheaths of plastic material as well as potentially tensile elements and filling compounds. The improved cable being recyclable, since the other component parts contain only polyolefins and small amounts of glass or inorganic fillers, so that the cable can easily be recycled into pellets having the inorganic fillers and glass acting as reinforcing elements.

2 Claims, 3 Drawing Sheets

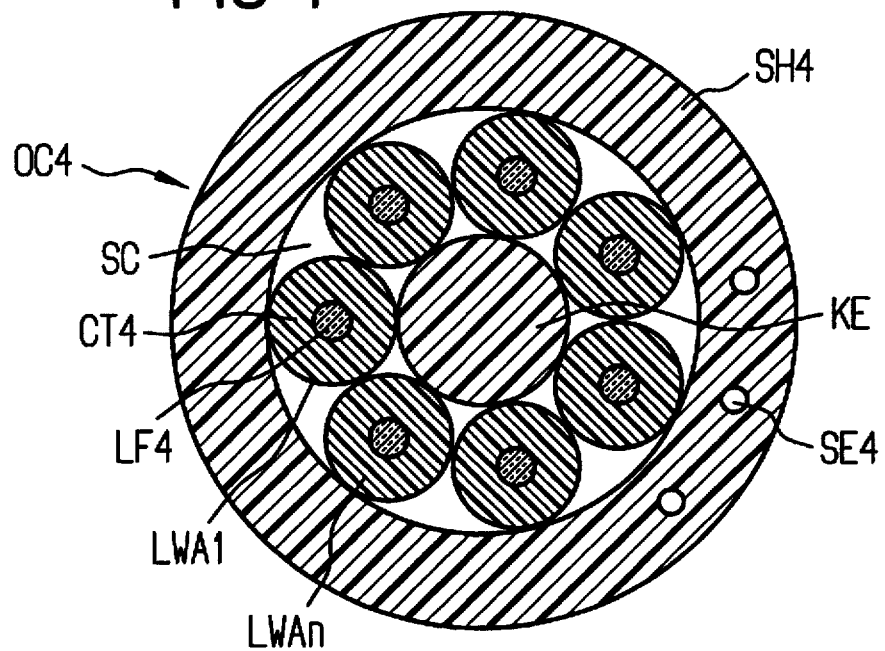
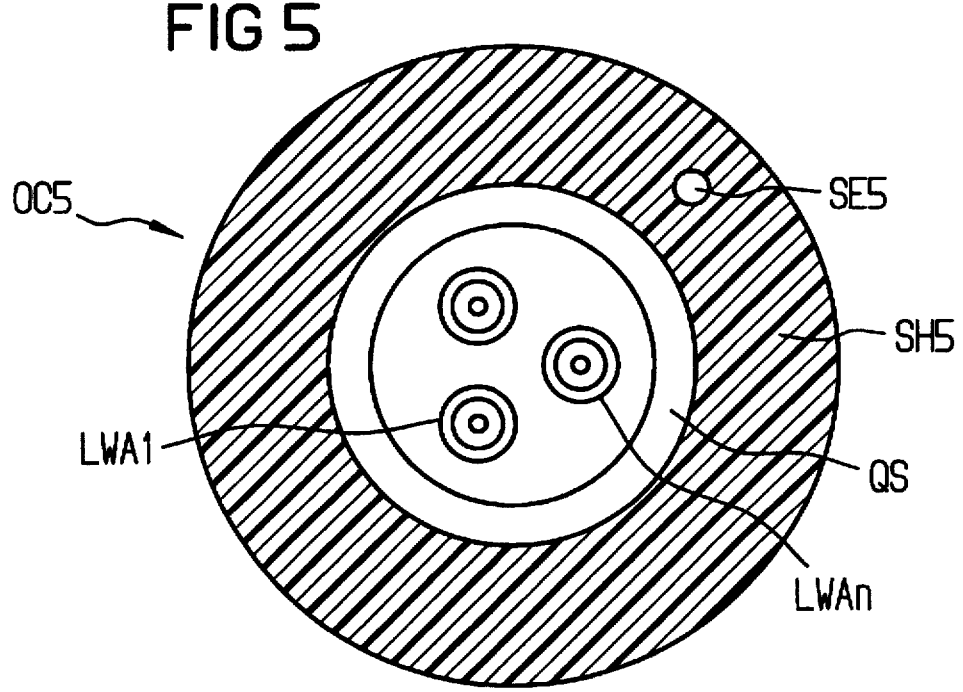

METHOD FOR THE RE-UTILIZATION OF AN OPTICAL

BACKGROUND OF THE INVENTION

The present invention is directed to an optical cable having at least one light waveguide and the cable includes a coating as well as other component parts in the form of a protective sheath of plastic material as well as potentially tensile elements and/or a filling compound.

Known optical cables are mainly designed so that they adhere to the desired mechanical and optical properties. In particular, value is placed on achieving a corresponding tensile strength, satisfying predetermined bending stresses and the like. The materials employed for the known cable designs, in fact, meet these technical demands, but generally are difficult to recycle or cannot be recycled at all because the cables are composed of extremely different materials that are difficult to separate from one another. In addition, expensive materials and manufacturing processes are often utilized.

SUMMARY OF THE INVENTION

The object of the present invention is to create a cable structure that allows an easy recyclability. This object is achieved in that the cable has at least one optical waveguide, and all of the other component parts of the cable are composed of polyolefins and potentially glass and/or inorganic fillers.

As a result of the standardized initial materials of the inventive cable that are essentially based on glass and polyolefins, this cable can be easily recycled, in particular, for example, it can be converted into a new mixture of initial substances, such as granules, by comminution or, respectively, mincing and these particles need not be separately or thermally disposed of, but can be employed for the manufacture of new plastic parts. The glass particles occurring from the light waveguides upon comminution will act as reinforcing elements so that such recycling materials can particularly be employed where fibrous reinforcing materials have already embedded into the plastic matrix, for example for GFK or fiber reinforced plastic mats and cover elements in automotive technology or the like. Potential component parts in the form of glass, for example tensile glass threads or inorganic fillers, are of no consequence.

Other components parts of the cable, for example elements except the light waveguide, should expediently amount to more than 98 weight percent, and preferably 99.5 weight percent of the cable.

The invention is also directed to a method of re-utilization of the optical cable of the invention, which is characterized in that the cable whose other component parts are only composed of polyolefins and potentially glass and/or inorganic fillers is converted into a mixture on the basis of a comminution process and that the new shaped plastic members are manufactured from this mixture, particularly by extrusion, so that the remaining glass constituents serve as reinforcing glass fiber inserts of the polyolefin matrix.

The component parts employed in constructing a cable are discussed in detail below and the embodiments expedient in view of the realization of the invention are set forth:

1. Glass Component Parts 1.1 Light Waveguides

Glass component parts with the light waveguides fit directly into the required composition of the other component parts, since they are composed only of glass. Since the cable manufacturer generally has no influence on the type and composition of the protective coatings on the light waveguides, these must generally be accepted. Since these materials are currently essentially composed of crosslinked acrylic resins, they do not represent polyolefins in the strictest sense. On the other hand, however, it must be taken into account that the material percentage of these coatings in the optical cable is practically negligible and lies below one weight percent of the cable at any rate. Such slight "contaminants" of the other component parts of the cable structure otherwise composed only of glass and polyolefins can be accepted.

If, in the future, it were possible to induce the fiber manufacturers to not employ coats of acrylic resin, then thermoplastic materials would preferably be utilized as a coating material in the light waveguides which offer the desired protective and strength properties for the actual optical fibers and do not denote a disturbing constituent in the cable structure of glass and polyolefins.

All other potential component parts of the cable that are not composed of glass or polyolefin should be kept below one weight percent, and preferably below one weight percent of the overall cable so that they do not deteriorate the behavior of the granulate obtained upon comminution.

1.2 Reinforcements or Tensile Elements

Additional reinforcing fibers can be embedded in the cladding or in the region of the cable core as well. These reinforcing elements will not have an adverse affect on the recyclability of the inventive cable if there is an appropriate selection of materials.

1.2.1 Tensile Elements

In the inventive cable, these are preferably fashioned as glass fibers and it is generally expedient to have these embedded into the plastic matrix. The glass fibers serve as reinforcing elements and are advantageously embedded into the matrix that is composed of a polyolefin and polypropylenes are especially suited for this purpose.

Solid plastics, such as, for example, polycarbonates that are referred to as MFR ("melt filament reinforced") can be particularly employed as such filaments. The use of LCPs ("liquid crystal polymers") is also possible within the scope of the invention in order to improve the strength properties of the cable. A preferred method is using reinforcing elements from the same family of materials as the matrix material, for example medium-density polyethylene (MDPE). This means that the sheath material is composed of, for example, a high-density polyethylene, or HD-PE, and the reinforcing fibers are, likewise; composed of polyethylene, but of a polyethylene having a higher density, for example ultra-high-density polyethylene.

Extremely longitudinally-oriented molecule chains that are embedded into the lead material, for example the melt filament reinforced filaments, can be produced in a special tool, preferably in the form of an angular extruder head. So that such filaments comprise an especially chain orientation and high shearing forces can be realized in the flow channel, it is expedient to place the filaments into adequately low temperatures during the embedding in the surrounding matrix upon implementation of the extrusion process in order to prevent a reorientation. To this end, the filaments are advantageously manufactured of extremely high-molecular polyolefins that yield good chain orientation at the processing temperature of the matrix material, which is expediently composed of a relatively low-molecular polyolefin).

For promoting the orientation and, potentially, additional reinforcement in longitudinal direction, various additives can be advantageously added to this reinforcing material, for example glass fiber chips and/or, preferably, mineral fibers having filaments or, respectively, rod structures. Specific liquid crystal polymer compounds that can be processed at low temperatures are suitable for improving the flow properties for improving the orientation and also for reinforcement given a higher dosing.

A further version of the self-reinforcement can be achieved in that, for example, the inner layer of a tubular envelope of the filling compound that is introduced into a light waveguide lead, for example, for the purpose of sealing, is brought to a low temperature at which the material can be oriented in a flow direction. During the additional process after departing the shaping nozzle, the material of the filling compound is cooled or, respectively, kept cool. In this case, the oriented material at the inner layer or coating can be identical or similar to the non-oriented material of an outer envelope or sheath. An example of the formation of two layers is shown in FIG. 2. The following are to be cited as additional exemplary embodiments of the invention: pure polyolefin parts, for example small polyolefin tubes, preferably polypropylene, optionally highly filled for reinforcement with, for example, calcium, carbonate, silicates or other inorganic fillers.

The cable claddings are already usually composed of polyolefins, particularly polyethylene materials, so that the cable claddings can be fashioned single-layer or multi-layer. Such cable claddings usually contain additives, particularly lampblack or carbon black and stabilizers that prevent a premature thermal oxidation, aging as well as damage due to influence of light. Most of these materials do not oppose a reprocessing of the mixture formed of the inventive cable, for example in the form of granulate and, for example, like the ultraviolet stabilizers in the lampblack used for pigmentation, can be accepted without further ado in a new shaped member manufactured from the granulate.

3. Further Plastic Materials Within the Cable Core

Additional component parts that can, for example, be also provided within the cable core are small protective tubes for the acceptance of one or more light waveguides, additional intermediate coats or inside claddings, wound films, cushioning layers or the like. All of the solid shaped parts are manufactured essentially of polyolefins in the invention and the intended purpose of the optical cable also generally allows this.

4. Pasty Filling Compounds of Filling Foams

The light waveguides are generally surrounded with a filling compound, for example a lead filling compound, in order to protect them against mechanical stresses and/or chemical modifications, for example oxidative decomposition of the fiber coating or, respectively, in order to assure the longitudinal water-tightness at the cable ends or given damage to the cables. This is also true of core filling compounds.

4.1 Pasty Filling Compounds

Such pasty filling compounds essentially contain oil, a thickener as well as a thixotropic agent, for example in the form of $SiO_2$. The following can be employed as thixotropic agents within the scope of the invention without creating a negative influence on the re-processability of the granulate or granules: highly disperse silicic acid (for example sold under the tradename "Aerosil" from Degussa; "HDK" sold by Wacker), as well as all standard inorganic fillers, such as montmorillonites, zeolites, chalks and oxides of the earth alkalis, of titanium, zinc and aluminum insofar as they are present in a highly-dispersed distribution.

Organic thixotropic agents can also be utilized insofar as they are accessible to recycling, for example castor oil derivatives, rilanite types, as well as organically modified bentonites and hectorites and low-molecular poly-alpha-olefins.

Particularly easily decomposable and recyclable polyolefins, both crosslinked as well as uncrosslinked, are suitable within the scope of the invention as organic thickeners in the filling compound.

This is especially true of polyethylene waxes, branched and unbranched paraffins, polypropylenes, specifically atactic polypropylene or APP, polyisobutylene, for example sold by BASF under the tradename "Oppanol B3/B10", as well as polybutylenes, naptel types and EPM/EPDM rubbers.

Styrol-butadine copolymers with excellent thickening properties represent a special case. In the strictest sense, they are not polyolefins, but halogen-free and in proportions below 10% are fully compatible and co-granulatable with polyolefins and are, therefore, suitable as thickening agents for lead filling compounds within the scope of the present invention.

The oil part of the filling compound is kept as low as possible within the scope of the inventive employment, since this is potentially disturbing in the later recycling process. Three to thirty weight percent with reference to the overall filling compound proportions are preferably adequate.

Two different possibilities of oil additives are suitable for the employment.

First, the employment of a synthetic or, respectively, naphthenic, largely aromatic-free oil with a boiling point that has a low viscosity at room temperature, preferably 0.1–50 mpas.

In the recycling of the cable, a vacuum stage, for example a fluidized bed with high air circulation is to be introduced between comminution and regranulation, the volatile oils being removed therefrom, preferably at elevated temperatures in the range of 60° C. to 150° C. and being capable of being re-employed as filling compound constituents after condensation and filtration.

Freeze-drying with preceding low-temperature grinding of the cable is technically feasible, but more complex.

Another, though somewhat less environmentally safe separation of the oil is the extraction of the cable constituents with the harmless cold-cleanser, usually higher esters or, respectively, paraffins with a low boiling point, with following drying before granulation.

On the other hand, oils having a high boiling point and higher molecular structure, what are referred to as process oils, are intentionally employed within the framework of the invention. These only serve the purpose of producing a doughy consistency of the polyolefin constituents in order to enable a soft, pasty consistency in the service temperature range of the cable and in order to assure an easy workability of the filling compound in the cable manufacture.

This high-molecular residual oil constituent of the cable, which constituent is polymer-compatible, can remain in the granulate or granules when recycling the cable. The oil thereby serves as a softener and improves the ultimate properties of the recycling material, such as hardness and stretching to a very substantial extent.

An especially suitable, pasty filling compound can, for example, be composed of 80 to 90 weight percent polyolefin with low softening temperatures, such as, for example, a polyethylene was, an ethylene vinyl acetate copolymer, a high-molecular polyisobutylene, such as sold under the tradename "Oppanol B3/B10", as well as, for example, atactic polypropylenes or APP. 10–20 weight percent of a preferably low-aromatic mineral oil with a high boiling point or, respectively, petrolatum can be added to this material for additional softening and for lowing the softening range.

High-molecular, branched synthetic oils, for example poly-α-olefins, PAOs, are especially suitable, since they promise good low-temperature fluidity. Good processability in the temperature range of 100° C. to 160° C. and their soft pasty property pattern in the temperature range of −40° C. to +70° C. given a simultaneously adequate resistance to bleeding at temperature ranges of 80° C. to 100° C. are characteristic of these filling compounds. As set forth in greater detail above, the recycling capability is not deteriorated by the slight oil additive. The compatibility with other cable constituents is, thus, assured.

Practically no oil leaches from the filling compound at the elevated temperature is found due to the low oil additives.

4.2 Expanded Filling Compounds

Filling compounds of foamed polyolefins can be especially advantageously employed as filling compounds. Such foamed polyolefins can be relatively economically manufactured according to known methods, and offer adequate protection for the light waveguides and also assure the necessary longitudinal water-tightness given appropriate manufacture or composition.

The inventive suitable cable filling compounds are disclosed in U.S. Pat. No. 4,387,958, whose disclosure is incorporated herein by reference thereto and which claimed priority from German Application 30 18 141.

For foamed or cellular filling compounds, the following determinations are especially expedient:

The degree of cellularization should be advantageously more than 50%, preferably in a range above 90%. The average pore diameter is expediently selected between 0.1 and 1 mm, whereby what is understood by pore diameter is the diameter of the air or gas inclusion within the foamed polyolefin compound. Pure polyolefins or ethylene-propylene-copolymer rubber, such as EPM, ethylene-propylene diene monomers, such as EPDM, and the crosslinked as well as uncrosslinked condition, atactic polypropylene or APP, or finally, ethylene vinyl acetate copolymers, such as EVAS, are advantageously employed as initial materials for the manufacturer of compounds to be foamed.

The respective pores should be closed, and this can occur on the basis of an appropriate control of the cell growth, on the basis of the selection of the most favorable materials and appropriate additives. In particular, silicic acids, such as "HDK" and "Aerosil", as well as talcum and rutile (titanium dioxide) can, in particular, be employed as nucleators.

The addition of the slightest possible amounts, for example less than 0.1%, of a surface-active substance, for example silicone oils, is meaningful for controlling the foaming and stabilizing the bubbles. These harmless additives remain in the recycling material during granulation of the cable constituents. The addition of these substances, however, is not absolutely compulsory within the scope of the present invention.

The adequate viscosity of the melt during the cell growth represents an important point of view for an optimum cellularization, particularly given employment of polyethylene as initial material, in order to prevent a collapse of the cells. This, for example, can be achieved in that the non-vulcanized ethylene-propylene copolymer rubbers have a high melt viscosity, equal to the low melt flow index or MFI, according to ASTM D-1238 standards in the range of 0.2–20 g/10 min., and preferably 0.5–2 g/10 min. and a molecular weight of greater than 100,000 are employed. Given these materials, a certain incipient crosslinking during the cellularization is advantageous.

Electron beam crosslinking is thereby less suitable, since damage to the light waveguide potentially will occur. By adding vinyl-substituted polymers or, respectively, ethylene-propylene-diene monomer rubbers to standard polyethylene, the material is expediently slightly radically crosslinked during the extrusion under the influence of peroxides, and this will result in an adequate melt stability.

Thermoplastic foam extrusion is preferably suitable as a manufacturing method for such thermoplastic foams, the manufacture occurs therein in a preceding process in, for example, the form of a tandem extrusion and the polyolefin foam stabilized in this way being introduced into the cable core or, respectively, into the protective sheath with a filling needle on-line during the extrusion of the other cable component parts, such as, for example, the central element, cladding, etc. Such filling methods with filling needles are already previously known in the introduction of, for example, pasty filling compounds and can also be analogously applied here for the introduction of polyolefin foams. The foam itself is subsequently frozen by subsequent cooling, wherein the temperature between 100° C. and 180° C. are expedient for the introduction of the foam. In order to assure a dimension-stable outside sheath, what is referred to as an outside calibration can be potentially introduced into the cooling basin.

The additives, referred to as "kickers", that are necessary for the cellularization should be expediently composed of the following materials, insofar as they themselves do not represent polyolefins: talcum, chalks and other standard, inorganic fillers.

Chemical foaming agents are usually added to the matrix to be foamed in proportion of 0.5 to 5 weight percent. Inventively, 0.3 to 2 weight percent are fully adequate in order to obtain the desired degree of foaming. The part of the foaming agent is converted into gas during the cable manufacture, i.e., no longer needs to be recycled. The remaining inorganic part remains in the recycled product as inert filler and need not be removed.

A necessary or desired cellularization can be achieved in the chemical foaming advantageously by adding highly-volatile hydrocarbons, particularly pentane, butane, propane, cyclohexane, in small amounts from 1 to 5 weight percent of the base polymer, and these act as a sponging agent. Another standard method is the addition of chemical sponging agents, such as azodicarbonamide, hydrazides, sodium hydrogen carbonate and citric acid in approximately identical quantity ratios of 1 to 5 weight percent of the basic polymer, as noted above. When heated, these substances give off inert gasses, such as, for example, nitrogen or carbon dioxide, that will effect the cellularization. One must thereby expediently see to a correspondingly exact temperature control and regulation of the fractioning process.

Another modern foaming method employable in the scope of the invention is physical cellularization by relaxation of compressed gasses in the thermoplastic melt and freezing this condition by cooling the matrix.

As gasses, for example nitrogen, carbon dioxide or, respectively, argon under high pressure, are impressed into the melt via a dosing means. Upon discharge from the extruder, relaxation to form gas bubbles at the introduced nucleators, such as talcum, HDK or chalk, mentioned above, will occur. This method requires exact pressure monitoring and control. The employment of a vacuum tool and/or a calibration or the thermoplastic melt hose is advantageous.

In particular, foamed rubber on a polyolefin basis can be advantageously employed as the foamed substitute filling compound within the scope of the present invention. Elastomer types are thereby expediently utilized that are uncrosslinked or, respectively, only incipiently crosslinked in order to assure a melting during recycling and the formation of a blend with other cable constituents, for example a central element or cladding. The following are to be cited as materials suitable for the manufacture of foamed rubber: crosslinked and uncrosslinked ethylene-propylene-copolymer rubber, such as EPM, ethylene-propylene diene rubber, such as EPDM, soft polyethylene and polypropylene types, atactic polypropylenes or APP, ethylene-vinylacetate-copolymers, such as EVA, and polybutadiene copolymers, polyisopyrene and PIB in the molecular weight range of 50 to 200,000 as well as "single site" elastomers and isotactic polypropylene. Cellularization and general properties of these materials are analogous to those of pure, uncrosslinked polyolefins.

Thermoplastic elastomers on the basis of polyolefins can be very advantageously and inventively employed. They are generally blocked, plugged and segmented copolymers that are constructed of two domains incompatible with one another. The property profile derives from the hard/soft characteristics and from the crystalline/amorphous segmentation, for example butadiene copolymers, EPDM-PP blends as well as EVA copolymers. Further technical details are disclosed in the above-mentioned U.S. Pat. No. 4,387,958.

The principal constituent or, respectively, the matrix material of the filling compounds should expediently amount to at least 90 volume percent thermoplastic material that can be directly melted and further-processed together with other cable constituents in the recycling of the cable without separating and cleaning processes. The further processing is thereby possible as homo-polymer or, respectively, a blend of simple articles of plastic for which the remaining glass filament parts advantageously serve as reinforcing inserts. Further fillers and auxiliaries can be potentially added with a maximum of 10 volume percent of the filling compound in order to improve the rheology, for example thixotropic agents, thickeners, as mentioned above. They are adequately environmentally friendly and inert and can remain in the recyclatate. No harmful substances are emitted upon melting when the following fillers and auxiliaries are employed: highly disburse silicic acids ("HDK" or "Aerosil"), montmorillonites, bentinates, rutile, chalks and the like.

The following are advantageously employed as main constituents of the filling compound given foamed polyolefins: preferably polypropylene, side-group-modified polypropylenes, low-density polyethylene, modified polyethylene, VPE as well as blends with EPDM.

Extreme softness and elasticity of the filling compound is required in order to function as a force-absorbent medium for the light waveguide, in particular a module of elasticity in the range of from 1 to 10 MPa over the entire temperature range of employment from –40° C. to +70° C., a minimum crack stress from 10% to 40% and Shore hardness A<10. The densities after foaming expediently lie at 0.01 to 0.1 g/ml. The tensile strength of the foam advantageously lies at 0.1 to 1 MPa.

5. Manufacturing Method of the Inventive Cable

Specific manufacturing methods are advantageously applied for the inventive cable. These are set forth in greater detail below.

5.1 Filling Compounds with Small Balls

Small balls can also be advantageously employed for filling the cavities between fibers and lead sheaths. These small balls can be composed of glass, small balls composed of plastic, particularly of polyolefin compounds are preferably employed (see, for example, EP-0 375 685 or U.S. Pat. No. 5,335,302, whose disclosure is incorporated herein by reference thereto and which claims priority from the same German Application as EP 0 589 274). These small balls are advantageously extremely highly expanded, whereby a "degree of expansion" of the filling compound containing the small balls of at least approximately 95% is expedient. The entrainment or, respectively, introduction of the small balls can advantageously occur in that the light waveguides are electrostatically charged and attract the hollow balls in this way. The quantity of entrained balls can be controlled in a simple way via the strength of the electrostatic charge. The cavities between the balls can be advantageously closed by adding an extremely slight amount of swelling agent, whereby these swelling agents are especially expedient that yield a great increase in volume given the approach of water. The fill of hollow balls thereby acts as a supporting grid for the swelling agent, for example a swelling powder.

The small balls can also be introduced unexpanded or partially expanded into an envelope, for example into a hollow lead, and be expanded in the hollow lead to their ultimate size. The expansion of these balls can advantageously occur in that the balls are brought to the desired expansion temperature by heating in the extruded but not yet completely cooled tube of the hollow lead. This can occur in that the extrusion of the plastic tube is implemented from the very outset with such a high temperature that an expansion or residual expansion of the hollow balls occurs. However, it is also possible to provide an additional re-heating within the framework of the extrusion process for the purpose of expanding or residual expansion.

Another expansion method can be comprised wherein the expanded balls are mixed into a carrier substance also suitable as a filling compound that is composed of a carrier substance having a suitable viscosity, such as, for example, poly-α-olefin, technical white oils and the like. The as yet unexpanded hollow balls can also be expanded by microwave heating. To this end, the hollow balls are manufactured of a material that has a higher dielectric loss factor than the material of the hollow lead. The small balls are heated under pressure in this filling compound and are transported into the envelope, for example the hollow lead. The transported quantity of filling compound and balls is dosed so that the balls can expand in the hollow lead and, thus, fill the interior of the hollow lead together with the light waveguides that have likewise been introduced. This method allows the balls to be conveyed into a hollow lead with dosing pumps, these balls not being capable of being pumped without further ado in their expanded condition due to their sensitivity to pressure and due to the risk of destruction caused as a result thereof, even in a carrier substance, such as a filling compound.

Other advantages and features of the invention will be readily apparent from the following description of the preferred embodiments, the drawings and claims.

BRIEF DESCRIPTION OF THE DRAWINGS

FIG. 4 is a cross sectional view of a cable with gores or spaces filled with foam;

FIG. 5 is a cross sectional view through an optical cable of the invention with a hollow interior.

DESCRIPTION OF THE PREFERRED EMBODIMENTS

Figure 1:
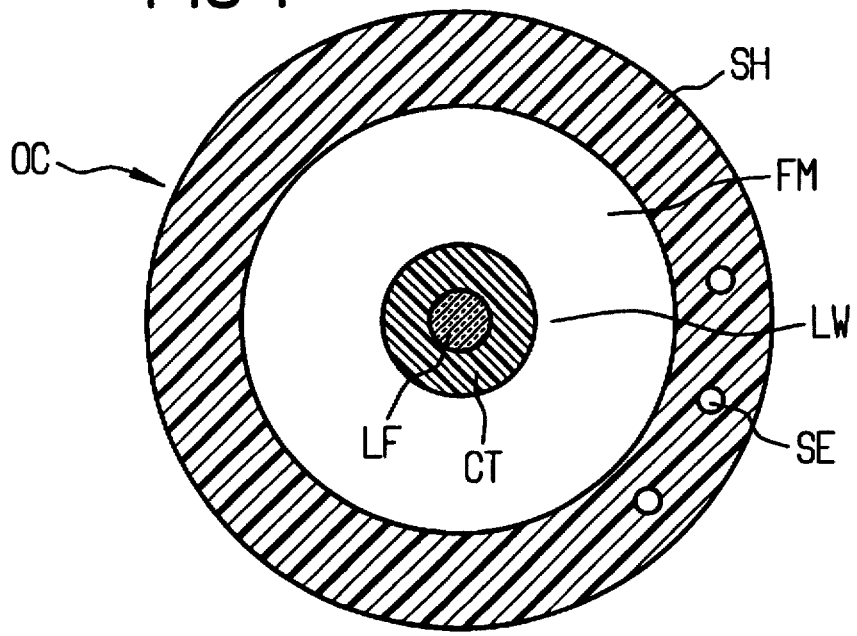
FIG. 1 is a cross sectional view of a structure of a cable in accordance with the present invention.

The principles of the present invention are particularly useful when incorporated in an optical cable, generally indicated at OC in FIG. 1. The cable OC is provided with a single-layer or multi-layer outer cladding SH in which tensile elements SE are inserted. Instead of, or in addition to, the individual tensile elements SE, one or more cladding layers that themselves are composed of high-strength, for example, stretched material, can also be provided, particularly given a multi-layer outside cladding. A filling compound FM that can be manufactured of foamed or of pasty material is provided in the interior of the outside cladding SH. Particularly given the employment of pasty compounds, embedding of individual hollow balls is also possible. It is assumed in the present example that only a single light waveguide LW is arranged in the outside cladding or sheath SH, and this is composed of a single optical fiber LF composed of glass and a protective coating CT applied on the outside of the glass fiber. Of course, it is also possible to embed a plurality of light waveguides LW into the filling compound FM or to provide some other type of light waveguides, for example in the form of light waveguide leads, particularly loose tubes or light buffers. It is provided within the scope of the invention that the entire cable structure, apart from the smaller percentage of additives, is essentially composed of only glass, for example optical fibers LF and, as warranted, reinforcing elements SE, or, respectively, the remaining constituents are essentially manufactured of polyolefins. Included among these are, in particular, the protective sheath SH and the filling compound FM. Moreover, the proportion of the total weight of the optical cable OC not composed of glass or, respectively, polyolefins should lie below 1%, and preferably below 0.1%.

Figure 2:
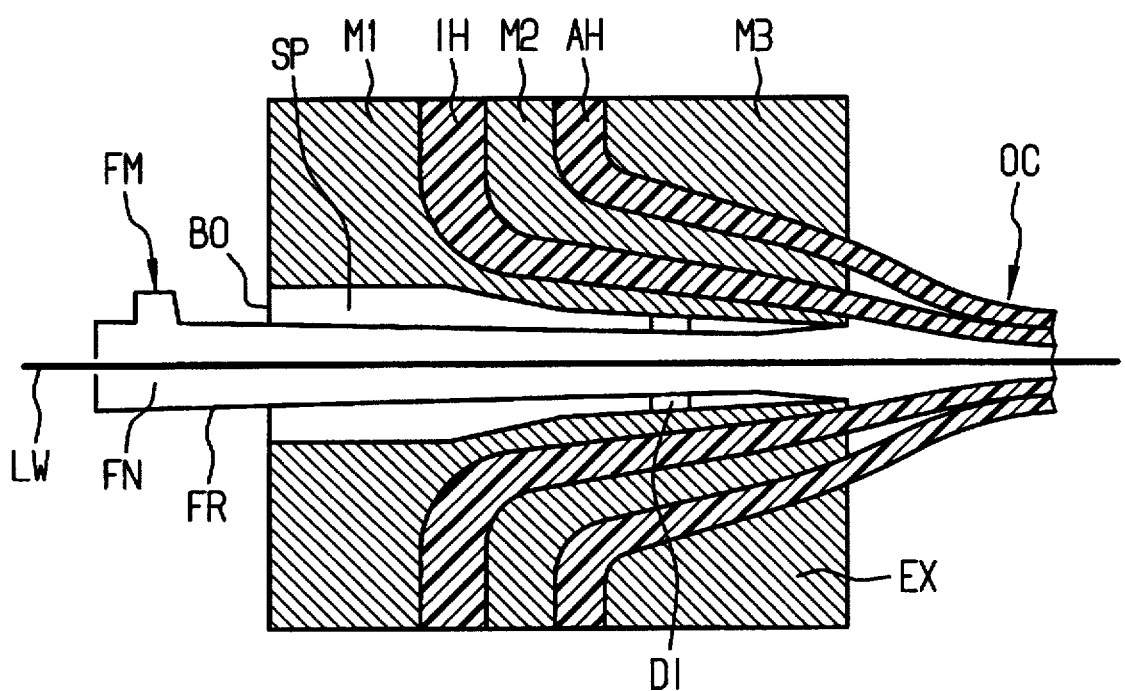
FIG. 2 is a cross sectional view of an apparatus for manufacturing a tensile-oriented sheath material.

In FIG. 2, an extrusion tool EX is illustrated, which enables a layer of outside sheath SH of FIG. 1 to be manufactured of a specifically pre-stretched layer. One or more light waveguides LW are introduced into a filling needle or filling chamber FN that is introduced into a bore BO of the extruder head EX. An external sheath AH and a cooled, oriented inner sheath IH are pressed out by the co-extrusion from the extruder head EX as a two-layer envelope. The filling compound FM is guided in the guide tube FR, namely under pressure, and expands after leaving the guide tube FR. The filling compound thereby agglomerates at the edge of the mouthpiece M1, which serves as a guide of the cooled, oriented stretched inside material IH. The filling compound FM, which is kept at low temperature, preferably between 80° C. and 120° C., effects a cooling of the cooled material IH of the inner layer that is already kept at a low temperature, preferably between 120° C. and 180° C. The outside material AH is guided between the annular mouthpieces M2 and M3 with a slightly higher temperature, preferably between 130° C. and 220° C., so that the outside material has cooled to such an extent that when it meets the material of the inside sheath IH, no re-orientation of the stretched and, thus, tensile material IH will occur. In order to obtain an optical cable OC according to FIG. 1, the tensile elements SE are to be guided through the extrusion tool together with one of the material layers, such as AH or IH in a known way which has not been illustrated.

It can be expedient to provide a gap SP in order to avoid an additional heat transmission from the inside onto the mouthpiece M1 for the inner sheath IH. In addition, it is also possible to provide a cooling, for example, in the form of air-cooling or the like, in this gap, and the coolant stream is kept away from the filling compound FM by an annular ring seal DI.

Figure 3:
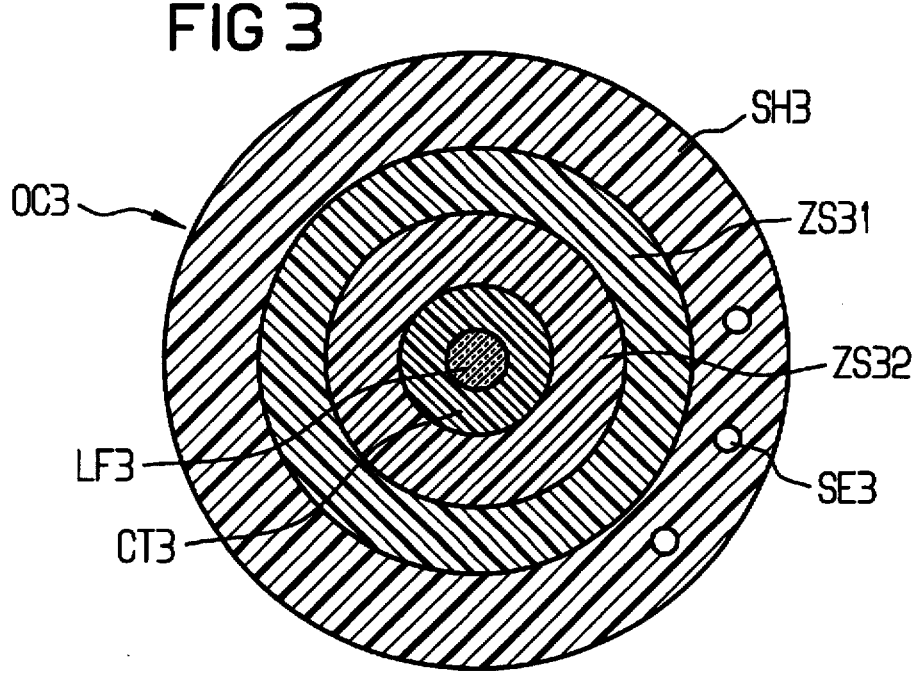
FIG. 3 is a cross sectional view of a cable in accordance with the present invention without filler material.

An optical cable OC3 is generally indicated in FIG. 3 and is similar to that of the compact lead or solid lead. A protective sheath SH3 is provided on the outside that can potentially contain reinforcing inserts, particularly in the form of glass fibers or the like, that can be recycled without further ado. This is followed by one or more intermediate layers until, finally, the actual optical fiber LF3 composed of core and cladding glass appears in the inside, a coating CT3 is applied to the outside of the fiber LF3. In the present example, two intermediate layers ZS31 and ZS32 are provided, wherein the outer intermediate layer ZS31 is preferably composed of a soft polyolefin material, whereas the inner layer ZS32 is fashioned as a parting compound layer and is preferably composed of Teflon powder. The cable constructed in this way contains only material parts in the form of glass, and when one leaves the coating CT3 and the potentially present, extremely thin Teflon powder layer out of consideration, easily recyclable plastic in the form of polyolefins.

An optical cable, generally indicated at OC4, is illustrated in FIG. 4 and has an outside comprising a protective sheath SH4 of polyolefin material, potentially with reinforcing fibers of glass. The core element KE that is composed of a tensile material, particularly of glass fibers embedded in a polyolefin matrix, is provided in the inside in the center. At least one layer of n-light waveguide leads LWA1–LWAn is stranded onto the core element KE. These leads are fashioned as compact leads, for example, respectively comprising an optical fiber LF4 composed of glass as well as a protective coating CT4 applied thereon. The gores or spaces between the fibers are filled with the foamed material SC that is, likewise, manufactured of polyolefin material. The cable OC4 obtained in this way can likewise be easily recycled, since, apart from the fiber coating CT4, it is composed only of polyolefin material and glass.

An optical cable, generally indicated at OC5, is shown in FIG. 5 and has an outside cladding SH5 composed of polyolefin material, potentially embedded with reinforcing elements SE5 of glass or of polyolefin material. A swelling layer QS is provided under the outside cladding or sheath, and this is composed of a material that increases greatly in volume in the presence of moisture and assures the longitudinal tightness of the cable. The individual light waveguide leads LWA1–LWAn are constructed as solid leads analogous to FIG. 4 and are loosely arranged in the air space that remains in the inside of the layer QS of swelling material. Apart from the fiber coating that may be of a potentially different composition, this cable is thus also composed only of glass and polyolefin material. Preferably, coming into consideration as swelling material for the swelling layer QS are: swelling fleeces or yarns or the like that contain absorbent polymers in addition to their carrier materials. Suitable materials are, for example, "cemitec" types such as "SSW25, STXN and SSS1 sold by the Geca Company or swelling powder such as, for example, "Sanwet" sold by Hoechst, "Cabloc", "Favor" or "Dynarsorb" sold by Stockhausen Company.

Figure 6:
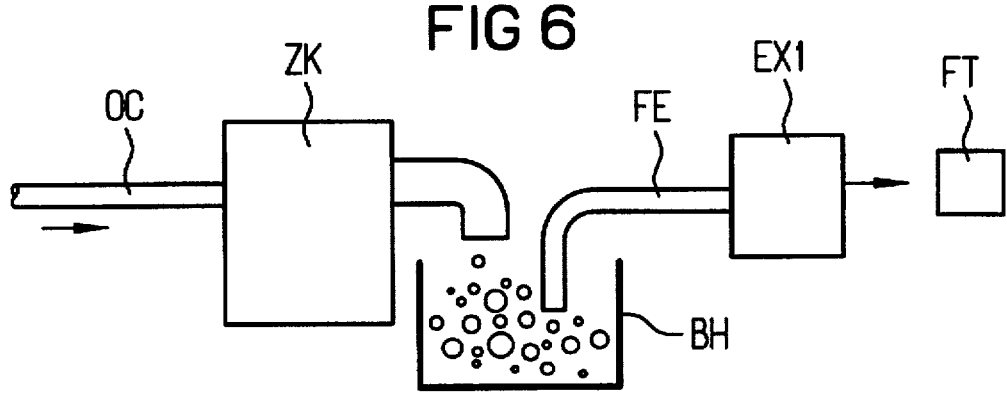
FIG. 6 is a schematic illustration of a system for recycling the inventive cable.

The optical cable of the present invention can be further processed or recycled as illustrated schematically in FIG. 6. The optical cable OC is supplied to a comminution system ZK, for example, the optical cable is cut into correspondingly small pieces. A separation into individual components or materials that can be distinguished from one another does not normally occur. The particles obtained in this way that, respectively, reflect the total content of the optical cable OC are introduced as a mixture, for example in the form of a bulk material, for example as granules, into a container BH. This bulk material can be packaged in corresponding other containers and can be transported to other places for operation or employment. In the present example, it is assumed for the sake of simplicity that the mixture composed of the individual particles is directly processed from the container BH and proceeds through a corresponding conveyor means FE to an extruder EX1. In this extruder EX1, the mixture containing all of the component parts of the original container OC is shaped into new formed parts FT, wherein the glass filaments and potentially existing reinforcing elements in the optical cable OC also enter into the shaped part FT as filament-like reinforcing materials.

It should be understood that various changes and modifications will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A method of recycling an optical cable comprising the steps of providing optical cables comprising optical light waveguides being provided with a coating free of a polyolefin and other components, said other components including jackets, filling compounds and reinforcing elements, said other component parts constituting more than 98 weight percent of the optical cable, said other components being composed substantially of polyolefins and materials selected from a group consisting of glass and inorganic fillers, said reinforcing elements being tensile elements selected from a group consisting of glass filaments, elements of high tensile strength polyolefin and combinations of glass filaments and elements of high tensile strength polyolefins, comminuting the optical cable to form small pieces, and then shaping plastic bodies from the mixture of the small pieces by extruding said mixture into pellets having a polyolefin matrix containing glass constituents and inorganic fillers as reinforcing inserts.

2. A method according to claim 1, wherein the mixture is brought into the form of a granulate during the comminuting process.

* * * * *